United States Patent
Day et al.

(10) Patent No.: US 9,269,136 B2
(45) Date of Patent: Feb. 23, 2016

(54) APPARATUS AND METHODS FOR REPLICATING A KEY FROM AN IMAGE DEPICTING THE KEY

(71) Applicant: Lockmasters Security Institute, Inc., Nicholasville, KY (US)

(72) Inventors: James W. Day, Nicholasville, KY (US); Matthew C. Myers, Lexington, KY (US)

(73) Assignee: Lockmasters Security Institute, Inc., Nicholasville, KY (US)

( * ) Notice: Subject to any disclaimer, the term of this patent is extended or adjusted under 35 U.S.C. 154(b) by 82 days.

(21) Appl. No.: 14/154,500

(22) Filed: Jan. 14, 2014

(65) Prior Publication Data

US 2015/0199801 A1 Jul. 16, 2015

(51) Int. Cl.
*G06K 9/46* (2006.01)
*G06T 7/00* (2006.01)
(Continued)

(52) U.S. Cl.
CPC ............... *G06T 7/001* (2013.01); *G01B 11/14* (2013.01); *G05B 19/4099* (2013.01); *G06K 9/48* (2013.01); *G06T 7/0044* (2013.01); *H04N 7/183* (2013.01); *G05B 2219/45245* (2013.01)

(58) Field of Classification Search
CPC ...... G06T 7/001; G06T 7/0044; G01B 11/14; G06K 9/48; H04N 7/183
USPC ............ 382/152, 209, 141, 203, 181; 70/409, 70/266, 336, 391, 393, 402, 405, 406, 344, 70/348, 357, 490, 491, 492, 493, 416, 419, 70/337, 340, 407, 420, 431, 447, 453, 421
See application file for complete search history.

(56) References Cited

U.S. PATENT DOCUMENTS

| | | | |
|---|---|---|---|
| 4,780,032 A | 10/1988 | Uyeda et al. | |
| 6,064,747 A | 5/2000 | Wills et al. | |

(Continued)

FOREIGN PATENT DOCUMENTS

| | | |
|---|---|---|
| CH | 703485 A1 | 1/2012 |
| CN | 102333660 A | 1/2012 |

(Continued)

OTHER PUBLICATIONS

Wired.com, The App I Used to Break into My Neighbors Home, http://www.wired.com/2014/07/keyme-let-me-break-in/, website, 4 pgs.

(Continued)

*Primary Examiner* — Sheela C Chawan
(74) *Attorney, Agent, or Firm* — Wood, Herron & Evans, LLP

(57) ABSTRACT

Embodiments relate to replicating a key from an image of the key when the key is unavailable to replicate the key from the key itself. In a first embodiment, a key blank of the key is generated when an end image of the end of the key is rotated to create a mirror image of the end image so that an outline of the mirror image is similar to a corresponding keyhole. A key blank generating machine generates a key blank of the key from the mirror image. In a second embodiment, a replica of the key is cut from the key blank when the maximum depths of cuts in the key image are measured. A bitting number database is queried for bitting numbers that correspond to the measured maximum depths. The bitting numbers are provided to a key machine to cut the key blank to generate a replica.

11 Claims, 8 Drawing Sheets

(51) Int. Cl.
*G05B 19/4099* (2006.01)
*G01B 11/14* (2006.01)
*G06K 9/48* (2006.01)
*H04N 7/18* (2006.01)

(56) References Cited

U.S. PATENT DOCUMENTS

| | | | |
|---|---|---|---|
| 6,406,227 | B1 | 6/2002 | Titus et al. |
| 6,647,308 | B1 | 11/2003 | Prejean |
| 6,836,553 | B2 | 12/2004 | Campbell et al. |
| 6,895,100 | B1 | 5/2005 | Pacenzia et al. |
| 6,978,939 | B2 | 12/2005 | Russell et al. |
| 7,911,655 | B2 | 3/2011 | Hatzav et al. |
| 7,967,513 | B2 | 6/2011 | Zhang |
| 7,995,140 | B2 | 8/2011 | Boutant |
| 8,056,805 | B2 | 11/2011 | Wolf, II |
| 8,059,883 | B1 | 11/2011 | Watts |
| 8,235,291 | B2 | 8/2012 | Wolf |
| 8,634,655 | B2 * | 1/2014 | Thompson et al. ........... 382/209 |
| 8,644,619 | B2 * | 2/2014 | Thompson et al. ........... 382/209 |
| 2004/0253067 | A1 | 12/2004 | Bosch |
| 2009/0180664 | A1 | 7/2009 | Efstathiades et al. |
| 2010/0278437 | A1 | 11/2010 | Thompson et al. |
| 2010/0316250 | A1 | 12/2010 | Perrigo |
| 2012/0093564 | A1 | 4/2012 | Bosch |
| 2014/0064597 | A1 | 3/2014 | Fagan et al. |
| 2014/0140628 | A1 * | 5/2014 | Thompson et al. ........... 382/203 |

FOREIGN PATENT DOCUMENTS

| | | |
|---|---|---|
| DE | 102005027102 A1 | 12/2006 |
| EP | 0556590 A1 | 8/1993 |
| EP | 1468769 A1 | 10/2004 |
| EP | 2396179 A1 | 12/2011 |

OTHER PUBLICATIONS

U.S. Patent and Trademark Office, Office Action in U.S. Appl. No. 13/833,313, Mar. 25, 2015.

European Patent Office, European Search Report in EP Application No. 15151135, Jun. 19, 2015.

* cited by examiner

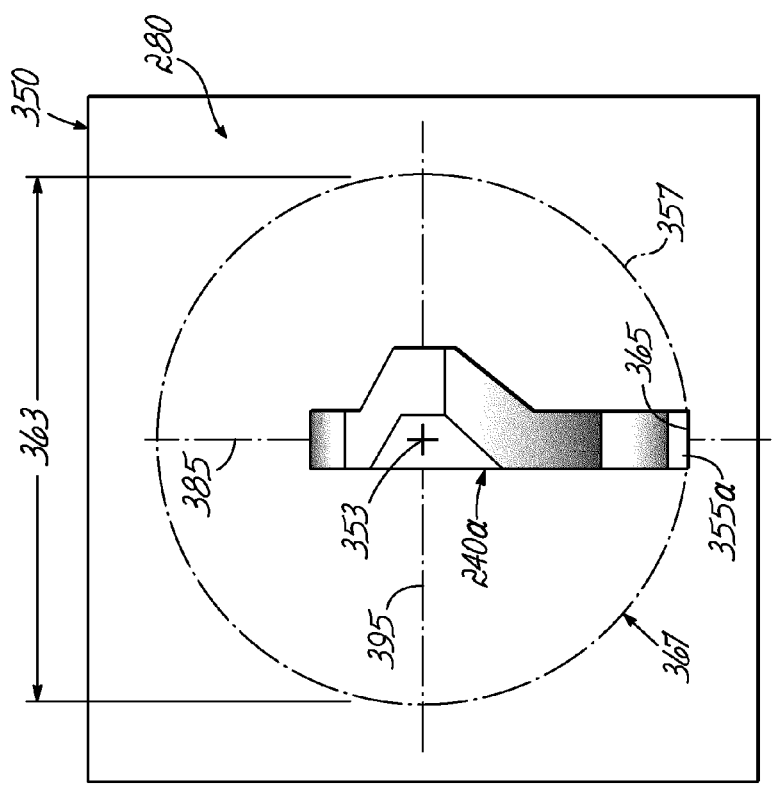
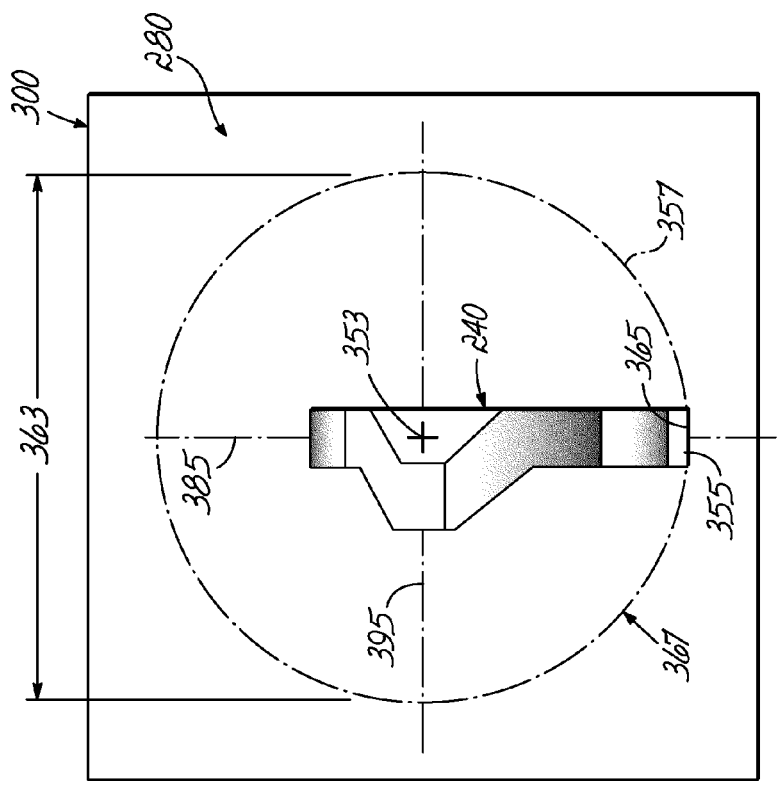

APPARATUS AND METHODS FOR REPLICATING A KEY FROM AN IMAGE DEPICTING THE KEY

CROSS-REFERENCE TO RELATED APPLICATIONS

This application is generally related to U.S. patent application Ser. No. 13/833,313, filed Mar. 15, 2013 (pending), the disclosure of which is incorporated by reference herein.

FIELD OF THE INVENTION

Embodiments relate generally to replicating a key, and more specifically, replicating the key from an image that has captured multiple views of the key in order to produce a replica of the key.

BACKGROUND OF THE INVENTION

Typically, in generating a replica of a key, a user possesses the key and has access to a typical key replicating device that is able to reproduce the key. However, possessing the key for a sufficient amount of time to replicate the key using typical methods that require the user to be in possession of the key may not be a feasible option in certain situations. For example, the user may not have sufficient time to be in possession of the key so that the user may replicate the key using the typical key replicating device. Typical methods also require substantial training of the user so that the user can accurately replicate the key. For example, capturing a clay mold of the key and then measuring the clay mold accurately so that the key can be adequately replicated from the clay mold measurements requires substantial training of the user and is not a trivial process.

However, the user may be in possession of the key long enough to capture an image of the key and then attempt to replicate the key based on the image of the key. Typical key replicating devices require a key manufacturer bitting number to be entered into the device to adequately replicate the key. The key manufacturer bitting number corresponds to a depth of each cut in the manufacturer's key. Other typical key replicating devices can replicate the key based on measurements taken for each depth of each cut in the manufacturer's key. However, simply entering manually obtained measurements from the image of the key into the typical key replicating device hinders the ability of the typical key replicating device to generate an adequate replica of the key. Approximating a manufacturer bitting number for the key may generate a more accurate replica of the key as compared to generating the replica from measurements. For example, the user measures a 0.230" depth for a cut in the key. However, the bitting number for the same cut in the key is a "4" that corresponds to a 0.237" depth for the same cut in the key. Thus, providing the bitting number to the typical key replicating devices provides a 0.007" more accurate cut in the key than providing inaccurate measurements to the typical key replicating device. Poor resolution in the image along with inaccuracies in the manually obtained measurements further hinders the ability of the device to adequately replicate the key.

SUMMARY OF THE INVENTION

Embodiments of the present disclosure relate to replicating a key based on images captured of the key while the user was in possession of the key long enough to capture the images of the key. The key is replicated using data obtained from the images of the key and then providing this data to a key blank generating machine and a key generating machine. A key blank of the key that the user requests to replicate may first be generated by the key blank generating machine based on the key image depicting the key. The key blank is then provided to the key generating machine so that the key generating machine may cut the key blank with manufacturer bitting numbers that were determined from data obtained from the key image depicting the key. The final product is a new key that is a replica of the key no longer available to the user where the new key was generated from the key images depicting the key. Embodiments of the present disclosure also provide ease of use for the user in replicating the key as compared to conventional techniques such as taking a clay mold of the key so that minimal training of the user is required to adequately replicate the key.

In a first embodiment, a computer implemented method includes steps so that a key blank image is generated from a key image of a key no longer available to the user. The key blank image is provided to a key blank generating machine that processes the key blank image to generate a key blank for the key. The key blank generating machine requires that a keyhole image of the keyhole of the lock that the key is to be inserted to lock and/or unlock the lock be provided to the key blank generating machine. The key blank generating machine then generates the key blank from the keyhole image of the keyhole. However, the user may not be able to obtain a keyhole image of the keyhole but the user may be in possession of key images of the key itself.

The key images of the key include an end image of an end of the key. The end of the key is a portion of the key that is aligned with the corresponding keyhole of the lock that the key is to be inserted to unlock and/or lock the lock. The end image may be rotated so that the rotated end image is a mirror image of the end of the key so that an outline of the mirror image of the end of the key is substantially similar to an outline of the corresponding keyhole that the key is to be inserted. A key blank image may be generated from the mirror image of the end of the key where the key blank image approximates a keyhole image of the keyhole that corresponds to the key. The key blank image may be provided to the key blank generating machine to generate the key blank of the key.

In a second embodiment, a system generates a key blank image from a key that is no longer available to the user that is capable of being processed by a key blank generating machine to generate a key blank of the key. An image capturing module captures an end image of an end of the key. The end of the key is a portion of the key that is aligned with a corresponding keyhole to insert the key into the corresponding keyhole. An image rotating module rotates the end image so that the rotated end image is a mirror image of the end of the key so that an outline of the mirror image of the end of the key is substantially similar to an outline of the corresponding keyhole that the key is inserted. An image generation module generates the key blank image from the mirror image of the end of the key to approximate a keyhole image of the keyhole that corresponds to the key. An image providing module provides the key blank image to the key blank generating machine to generate the key blank of the key.

After the key blank of the key is generated, the key blank is then provided to a key generating machine to cut the key blank so that a replica of the key may be generated. In a third embodiment, a computer implemented method includes steps for replicating a key that is no longer available to the user from a key blank of the key based on data obtained from key images of the key that are available to the user. The key generating machine requires that the bitting numbers as designated by the manufacturer of the key be provided to the key generating machine. Each bitting number corresponds to each cut in the key so that the key generating machine cuts the key blank based on the bitting numbers of the key that are provided to the key generating machine. However, the user is no longer in possession of the key and has to determine the bitting numbers from the key images of the key that are available to the user.

The key image of the key available to the user depicts a length of the key. Each cut located in the key as depicted by the key image may be identified. Each cut is identified as having a first edge and a second edge that are coupled together at a maximum depth point that is at a substantially maximum depth for the cut. Each maximum depth of each cut for the key as depicted by the key image may be measured. A bitting number database stores bitting numbers associated with a plurality of keys manufactured by a plurality of manufacturers. The bitting number database may be queried for each bitting number that corresponds to each measured maximum depth for each cut. Each bitting number that corresponds to each cut queried from the bitting number database may be provided to a key generating machine to cut the key blank based on each bitting number for each corresponding cut.

In a fourth embodiment, a system replicates a key that is no longer available to a user from a key blank of the key based on data obtained from a key images of the key that are available to the user. An image capturing module captures the key image of the key. The key image depicts a length of the key. An identification module identifies each cut located in the key as depicted by the key image. Each cut is identified as having a first edge and a second edge that are coupled together at a maximum depth point that is at a substantially maximum depth for the cut. A measuring module measures each maximum depth of each cut for the key as depicted by the key image. A querying module queries a bitting number database for each bitting number that corresponds to each measured maximum depth for each cut. A providing module provides each bitting number that corresponds to each cut queried from the bitting number database to a key generating machine to cut the key blank based on each bitting number for each corresponding cut.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to accompanying drawings. In the drawings, like reference numbers can indicate identical or functionally similar elements.

Figure 2:
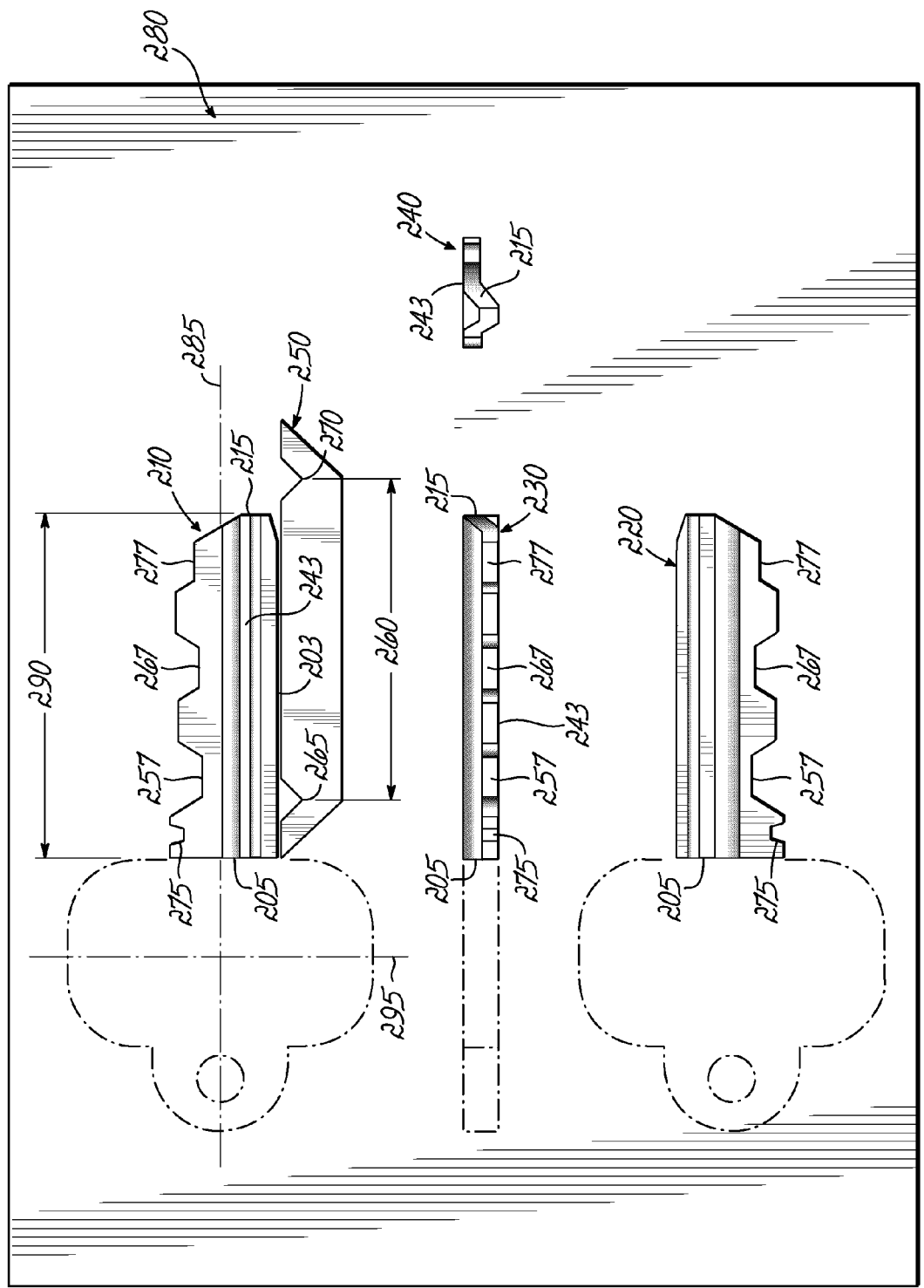
FIG. 2 shows a reflected image captured by an image capturing device of a key that the user requests to replicate, according to an embodiment.
Figure 2A:
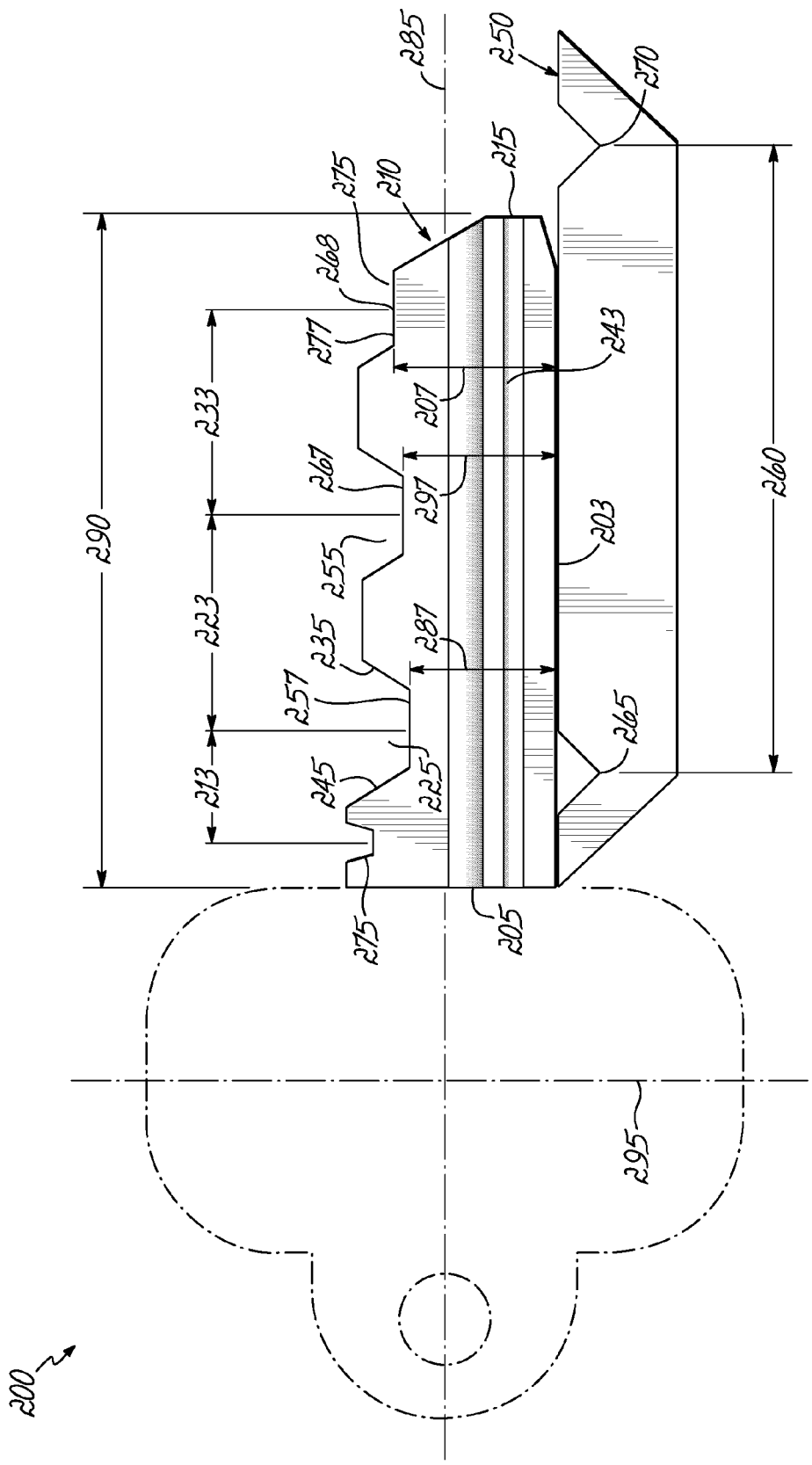

FIG. 2A an enlarged view of a first side image from the reflected image captured by the image capturing device of the key that the user requests to replicate, according to an embodiment.

FIG. 3A shows a scaled end image where a reference may be superimposed on the end image, according to an embodiment.

FIG. 3B shows the end image rotated so that the rotated end image is a mirror image of the end of the key so that an outline of the mirror image of the end of the key is substantially similar to an outline of the corresponding lock that the key is inserted, according to an embodiment.

Figure 4:
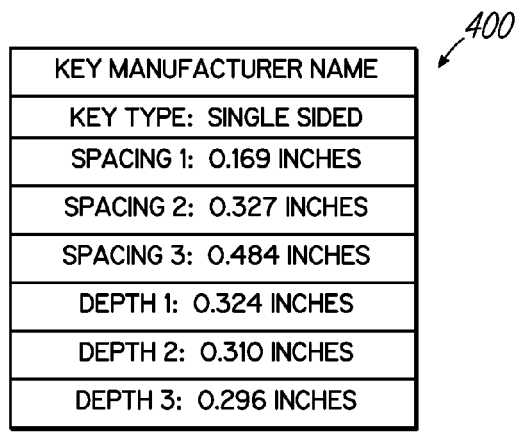

FIG. 4 shows an example bitting number database entry, according to an embodiment.

Figure 5:
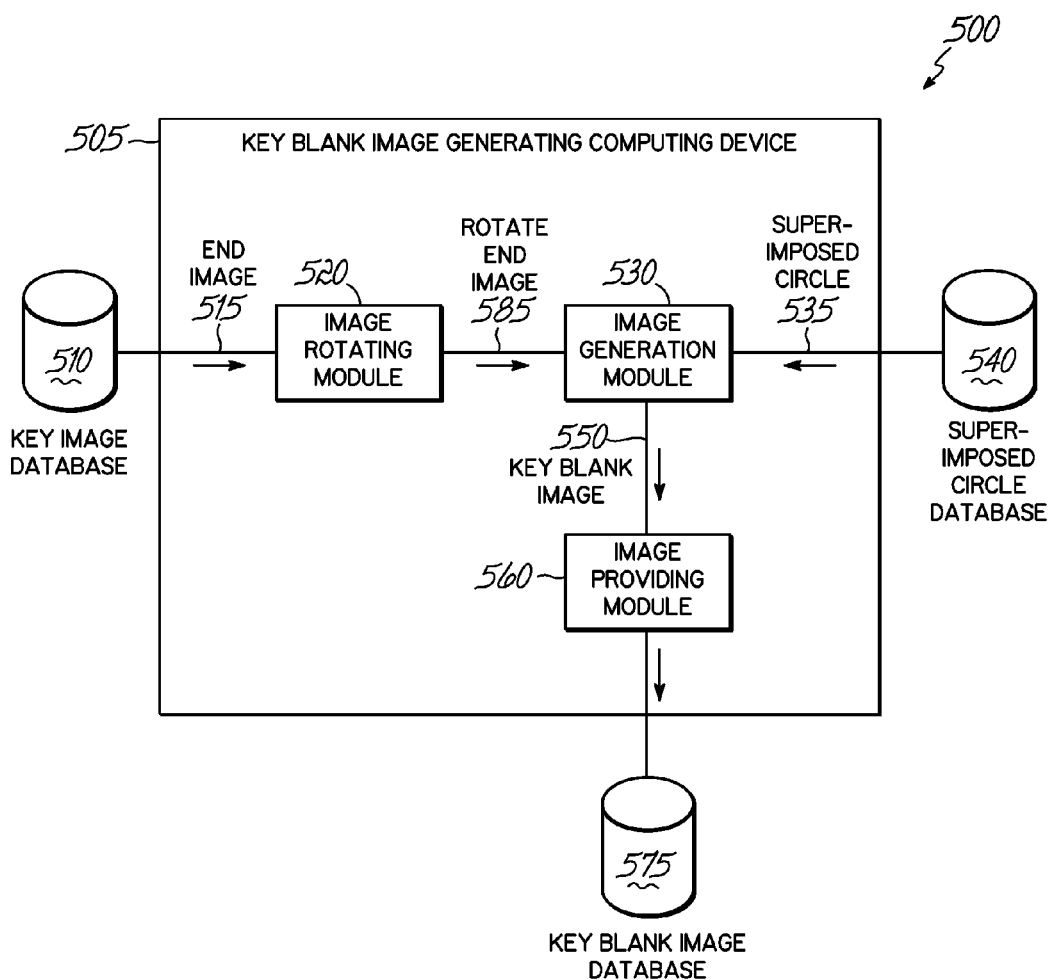

FIG. 5 shows an example database system architecture, according an embodiment.

Figure 6:
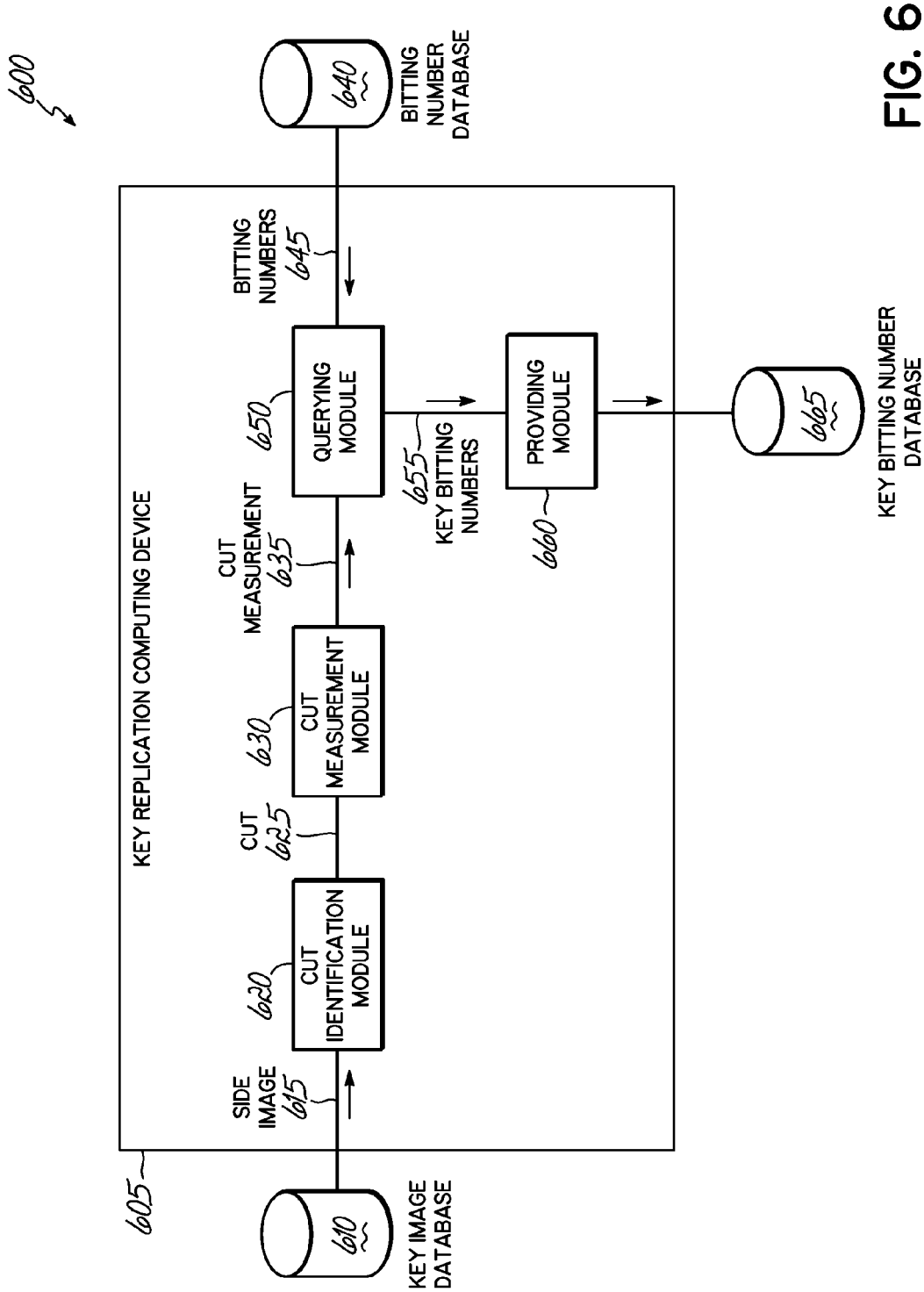

FIG. 6 shows an example database system architecture, according to an embodiment.

Figure 7:
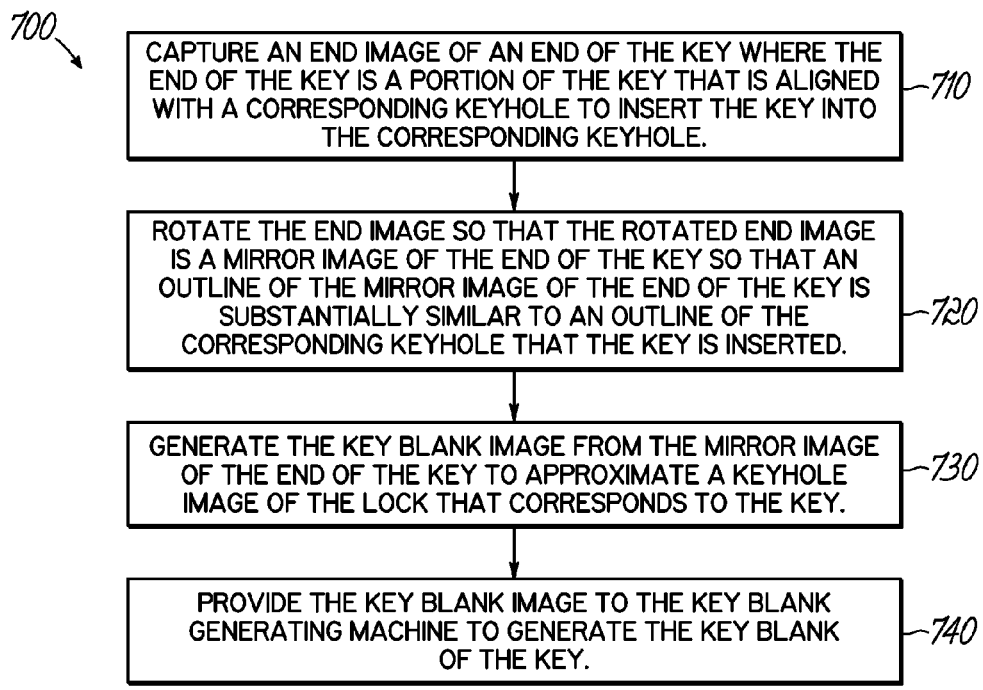

FIG. 7 shows a flowchart of an exemplary aspect of operation, according to an embodiment.

Figure 8:
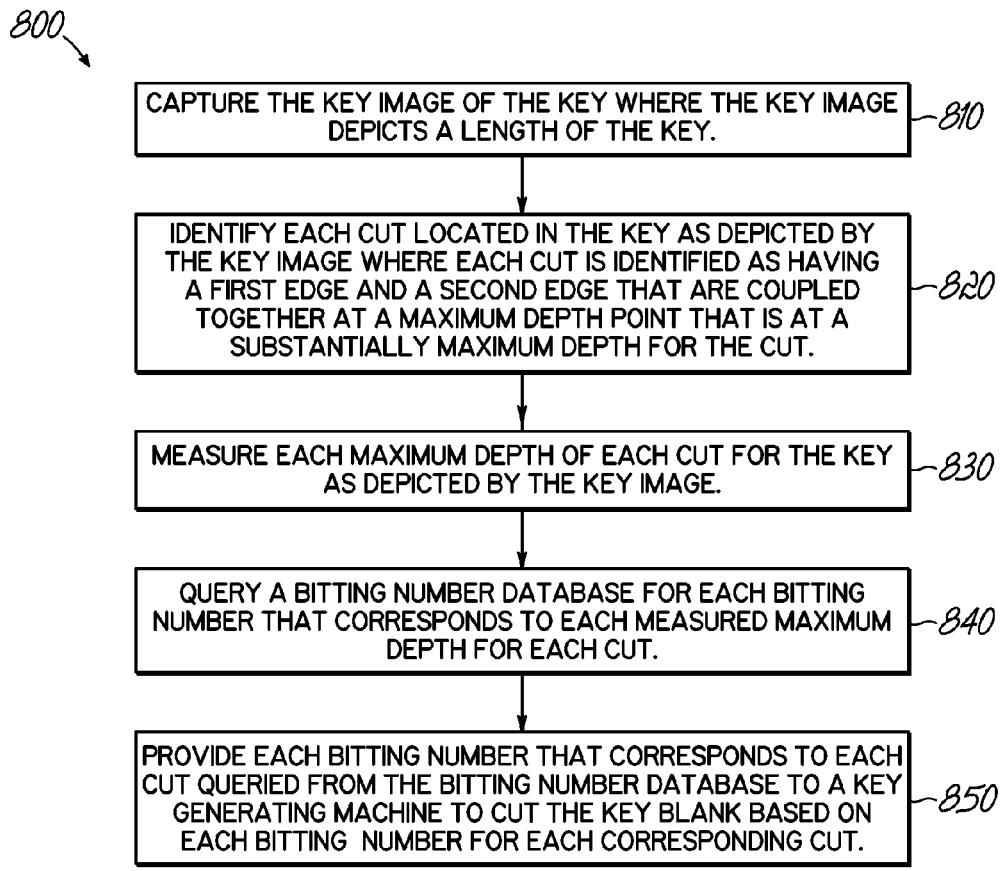

FIG. 8 shows a flowchart of an exemplary aspect of operation, according to an embodiment.

Figure 9:
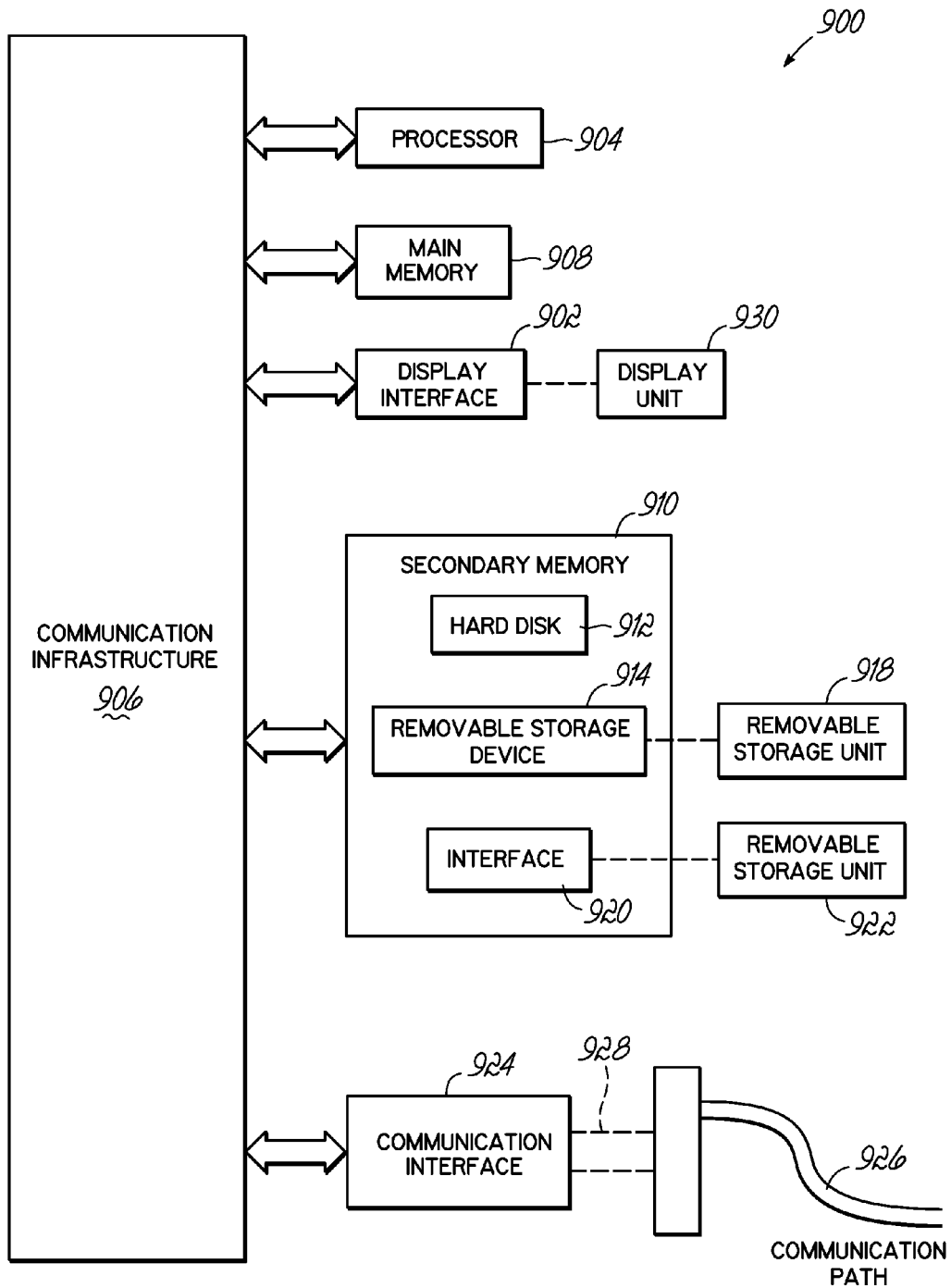

FIG. 9 illustrates an example computer system in which embodiments of the present invention, or portions thereof, may be implemented as computer-readable code.

DETAILED DESCRIPTION OF THE DRAWINGS

This detailed description generally relates to the field of key replication. A user requests to replicate a key but is unable to obtain physical possession of the key for a sufficient amount of time to replicate the key using the key itself. Rather, the user is in possession the key long enough to capture images of the key that provides several different views of the key.

The user first requests to generate a key blank of the unavailable key with a conventional key blank generating machine. The conventional key blank generating machine requires that an image of a keyhole that corresponds to the unavailable key be provided to the conventional key blank generating machine to generate the key blank from the image of the keyhole. However, the user may not have an image of the keyhole available. Rather, the user is in possession of an end image of an end of the unavailable key. The end of the key is a portion of the key that is aligned with the corresponding keyhole to insert the key into the corresponding keyhole. The end image is rotated so that the rotated end image is a mirror image of the end of the key so that the outline of the mirror image is substantially similar to an outline of the corresponding lock. As a result, the mirror image of the end of the key approximates the unavailable keyhole image of the corresponding keyhole. The mirror image is then provided to the conventional key blank generating machine to generate the key blank based on the mirror image of the end of the key rather than the image of the keyhole.

After obtaining the key blank for the key no longer available to the user, the user requests to replicate the unavailable key from the key blank based on the images available to the user of the unavailable key. In order to replicate the key, cuts in the key are to be replicated by a conventional key generating machine that makes substantially similar cuts to the cuts for the unavailable key in the key blank. Each cut in the key includes a first edge and a second edge that are coupled together at a maximum depth point that is at a substantially maximum depth for the cut.

The conventional key generating machine requires bitting numbers to be entered into the conventional key generating machine so that the conventional key generating machine can accurately cut the key blank to adequately replicate the unavailable key. The bitting numbers correspond to the depth of the maximum depth point for each cut in the unavailable key. The user is in possession of an image of the unavailable key that depicts a length of the key and each of the cuts in the key. Each maximum depth of each cut for the key as depicted by the key image is measured. A bitting number database is then queried for bitting numbers that correspond to the measured depths of the maximum depth point for each cut. Each bitting number is then provided to the conventional key generating machine to cut the key blank based on each bitting number for each corresponding cut.

In the Detailed Description herein, references to "one embodiment", "an embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic may be described in connection with an embodiment, it may be within the knowledge of one of skilled in the art to effect such feature, structure, or characteristic in connection with other embodiments whether or not explicitly described.

The following detailed refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments which would be of significant utility. Therefore, the detailed description is not meant to limit the embodiments described below.

Figure 1A:
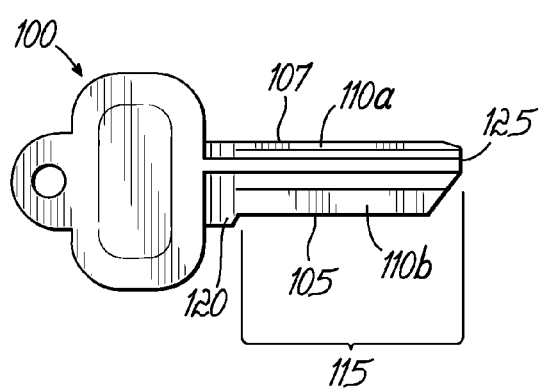
FIG. 1A is a diagram illustrating a conventional key blank.
Figure 1B:
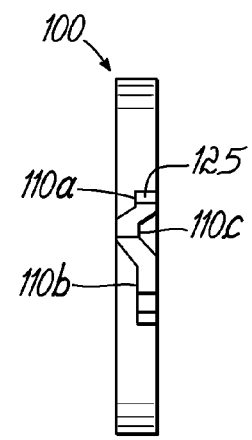
FIG. 1B is a diagram illustrating a conventional end of the conventional key blank.
Figure 1C:
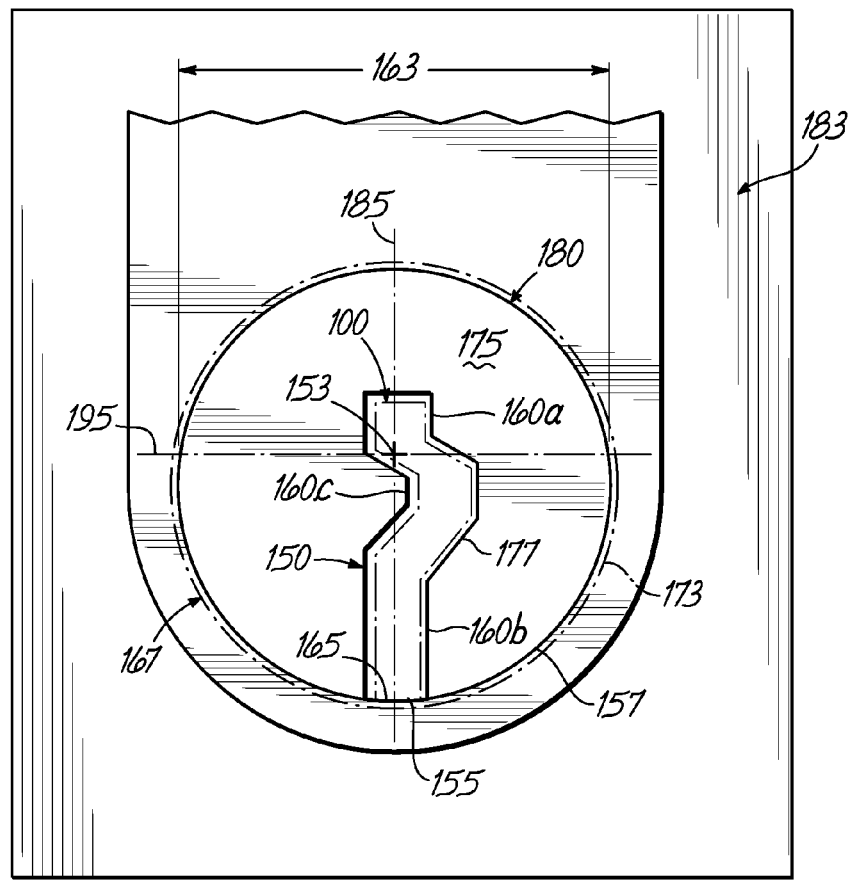
FIG. 1C is a diagram illustrating a photographic image of a conventional keyhole depicted by a user interface associated with a conventional key blank generating machine.

FIG. 1A is a diagram illustrating a conventional key blank 100. The conventional key blank 100 is a key that has been cut to include a cross-sectional profile that matches a corresponding keyhole so that the conventional key blank 100 is a male configuration that can be inserted into the corresponding keyhole. For example, FIG. 1B is a diagram illustrating a conventional end 125 of the conventional key blank 100. The conventional end 125 depicts the cross-sectional profile for the conventional key blank 100 that matches the corresponding keyhole for the conventional key blank 100. The conventional key blank 100 has been cut to include a plurality of slots 110a through 110c. Each slot 110a through 110c is cut at a depth that extends from the conventional end 125 to a key stop 120. The key stop 120 is a slot cut into the conventional key blank 100 where the conventional key blank 100 stops when inserted into the corresponding lock. As a result, an inserted portion 115 of the conventional key blank 100 that is inserted into the corresponding lock extends from the conventional end 125 of the key to the key stop 120. The key stop 120 is cut into a top side 107 of the conventional key blank 100 while the eventual bittings also referred to as cuts that actually engage the locking mechanism of the corresponding lock are to be cut into a bottom side 105 of the conventional key blank 100.

As noted above, the conventional key blank 100 is a key that has been cut to include a cross-sectional profile that matches a corresponding keyhole. For example, FIG. 10 is a diagram illustrating a photographic image of a conventional keyhole 150 depicted by a user interface 183 associated with a conventional key blank generating machine. The conventional key blank generating machine will be discussed in more detail below. The conventional keyhole 150 corresponds to the conventional key blank 100 so that the conventional keyhole 150 is a female configuration that receives the conventional key blank 100 that is inserted into the conventional keyhole 150. The conventional keyhole 150 includes a plurality of wards 160a through 160c that correspond to the plurality of slots 110a through 110c included in the conventional key blank 100. The plurality of wards 160a through 160c correspond to the plurality of slots 110a through 110c in that the conventional keyhole 150 is a mirror image of the conventional end 125 of the conventional key blank 100. The plurality of wards 160a through 160c are the protrusions in the conventional keyhole 150 that restrict an incorrect key blank from being inserted into the conventional keyhole 150.

For example, slot 110a of the conventional end 125 aligns with ward 160a of the conventional keyhole 150. Slot 110c aligns with ward 160c and slot 110b aligns with ward 160b. As a result, the conventional key blank 100 can be inserted into the conventional keyhole 150 so that the inserted portion 115 of the conventional key blank 100 is inserted into the conventional keyhole 150. The conventional keyhole 150 is also associated with a locking mechanism (not shown) that when aligned with the cuts not yet cut into the conventional key blank 100 will unlock or lock the locking mechanism. However, the conventional key blank 100 does not have such cuts yet cut into it so the conventional key blank 100 is limited to being properly inserted into the conventional keyhole 150 but is unable to unlock or lock the locking mechanism.

The conventional keyhole 150 includes dimensions defined by the plurality of wards 160a through 160c. The conventional keyhole 150 extends to an end stop (not shown) where the distance from the conventional keyhole 150 to the end stop is substantially equivalent to the distance of the inserted portion 115 of the conventional key blank 100. The conventional keyhole 150 also includes a lock cylinder 180. The conventional keyhole 150 is generated by machining the lock cylinder 180 to include the keyhole with the plurality of wards 160a through 160c that extend into the lock cylinder 180. The conventional keyhole 150 is positioned on a face 175 of the lock cylinder 180 that includes a y-axis 185 that extends vertically through a center point 153 of the face 175 and an x-axis 195 that extends horizontally through the center point 153 of the face 175. The conventional keyhole 150 is substantially centered on the y-axis 185 of the face 175. The conventional keyhole 150 is also positioned so that a bottom edge 155 of the conventional keyhole 150 is contingent to a face point 165 located on a circumference 157 of the face 175 below the x-axis 195 and substantially on the y-axis 185. The face 175 also includes a diameter 163.

Typically, the conventional key blank 100 is first required when replicating a key. After the conventional key blank 100 is obtained, the conventional key blank 100 can be provided to a conventional key machine that cuts the conventional key blank 100 to generate the cuts that align with the locking mechanism included in the conventional keyhole 150, thus replicating the key. However, the conventional key blank 100 is often difficult to obtain because the key manufacturer of the conventional key blank 100 restricts the availability of the conventional key blank 100. As a result, replicating the key is still a difficult endeavor even when the user has possession of the key that the user requests to replicate because the conventional key blank 100 is unavailable.

A conventional key blank generating machine, such as the Easy Entrie Key Machine manufactured by German company Schlussel-Charly Bosch GmbH, provides the user the capability to generate the conventional key blank 100 with a photographic image of the conventional keyhole 150 that corresponds to the conventional key blank 100. The user no longer is required to be in possession of the conventional key blank 100 to replicate the key. Rather, the user can capture a photographic image of the face 175 of the conventional keyhole 150 that corresponds to the key that the user requests to replicate to generate the conventional key blank 100. After the conventional key blank generating machine generates the conventional key blank 100, the conventional key blank 100 can then be provided to the conventional key machine that cuts the conventional key blank 100 to generate the cuts that align with the locking mechanism included in the conventional keyhole 150, thus replicating the key.

The conventional key blank generating machine software requires that the user provide a JPEG image of the face 175 of the conventional keyhole 150 that corresponds to the key that the user requests to replicate. The conventional key blank generating machine software displays the JPEG image of the face 175 to the user. The conventional key blank generating machine software enables the user to select a diameter 163 of the face 175 so that the JPEG image of the face 175 can be scaled by the conventional key blank generating machine software. For example, the conventional key blank generating machine software assumes that every conventional keyhole 150 follows a European configuration in that the diameter 163 of the face 175 is substantially equivalent to 17 mm. The conventional key blank generating machine software requires that the pixels included in the JPEG image of the face 175 be scaled to the 17 mm diameter 163 of the face 175. The conventional key blank generating machine software provides a reference 167. The reference 167 provides a reference with known dimensions relative to known pixels included in the reference 167 so that each pixel included in the JPEG image of the face 175 may be scaled so that an accurate key blank may be generated. As would be appreciated by one having skilled in the relevant art given the description herein, the reference 167 may be a circle, a straight line, and/or any other shape with known dimensions relative to known pixels included in the reference to that the JPEG image of the face 175 can be adequately scaled without changing the applicability of this invention.

Continuing with the example above, the conventional key generating machine provides the reference 167 that is a circle with a diameter of 17 mm via the user interface 183 to the user. The conventional key blank generating machine software requires that the user modify the JPEG image of the face 175 via the user interface 183 by scaling, zooming, distorting, and/or adjusting the JPEG image so that the circumference 157 of the face 175 as depicted by the JPEG image substantially aligns with a circumference 173 of the circle 167. The aligning of the circumference 157 of the face 175 and the circumference 173 of the circle 167 scales each pixel included in the JPEG image to 17 mm.

After the user has adjusted the JPEG image of the face 175 to align with the circle 167 via the user interface 183, the conventional key blank generating machine software requires that the user outline the perimeter of the conventional keyhole 150 as depicted by the scaled JPEG image of the face 175 to generate an outline 177 of the conventional keyhole 150 via the user interface 183 so that each of the wards 160a through 160c is depicted in the outline 177. The outline 177 of the conventional keyhole 150 is substantially aligned with the each of the wards 160a through 160c of the conventional keyhole 150 and provides data to the conventional key blank generating machine regarding the dimensions of the conventional keyhole 150 for each of the wards 160a through 160c.

The conventional key blank generating machine then uses the data associated with the outline 177 of the conventional keyhole 150 that is a female configuration to machine the conventional key blank 100 that is a male configuration from a brass slug. The conventional key blank generating machine converts the data associated with the outline 177 to generate the conventional end 125 of the conventional key blank 100 that is essentially a mirror image of the conventional keyhole 150 where each slot 110a through 110c included in the conventional end 125 correspond to each ward 160a through 160c included in the keyhole 150. For example, slot 110a of the conventional end 125 aligns with ward 160a of the conventional keyhole 150. Slot 110c aligns with ward 160c and slot 110b aligns with ward 160b. As a result, the inserted portion 115 of the conventional key blank 100 can be inserted into the conventional keyhole 150.

FIG. 2 shows a reflected image 200 captured by an image capturing device of a key that the user requests to replicate. As noted above, the conventional key blank generating machine requires that the user provide an image of the conventional keyhole 150 to generate the conventional key blank 100 that is needed to replicate the key. However, the user may not have access to the conventional keyhole 150 in order to capture an image of the conventional keyhole 150. Further, the user may also not be in possession of the key that the user requests to replicate.

In an embodiment of the present disclosure, the user is not limited to providing an image of the conventional keyhole 150 to the conventional key blank generating machine to generate the conventional key blank 100. Rather, as shown in FIG. 2, the user may capture an end image 240 of an end of the key that the user requests to replicate. As noted above, the end of the key is a portion of the key that is aligned with a corresponding lock to insert the key into the corresponding lock. The end image 240 may then be manipulated so that when provided to the conventional key blank generating machine, the conventional key blank generating machine software interprets the end image 240 as an image of the corresponding lock. The conventional key blank generating machine then machines a key blank based on the end image 240 for the key that the user requests to replicate rather than the image of the corresponding lock.

The conventional key blank generating machine may require that the end image 240 be of high quality and high resolution so that the conventional key blank generating machine generates an accurate key blank. For example, a lower quality image with lower resolution provided to the conventional key blank generating machine may hinder the accuracy of the generated key blank. As noted above, the conventional key blank generating machine software requires that the user scale the pixels included in the image to 17 mm and to then outline the keyhole. A lower quality image with lower resolution may not provide an accurate representation of the actual keyhole so that when the lower quality image is scaled to 17 mm and then outlined, inaccurate data of the dimensions of the key hole is provided resulting in an inaccurate key blank.

Further, the user may not be in possession of the key for a sufficient amount of time to adequately capture different views of the key so that each captured view of the key is of sufficient quality and resolution to generate an accurate key blank. An example of an image capturing system (not shown) that may capture an image, such as reflected image 200, of sufficient quality and resolution to generate an accurate key blank while capturing multiple views of the key at one time is provided in U.S. patent application Ser. No. 13/833,313, the disclosure of which is incorporated by reference herein.

The referenced image capturing system may capture the reflected image 200 when the user inserts the key into the referenced image capturing system. The referenced image capturing system may include a configuration of mirrors that capture different views of the key in the single reflected image 200. For example, the reflected image 200 includes a first side image 210, a second side image 220, a top image 230, and an end image 240 of the key. Rather than the user having to adjust the key and the image capturing device four different times to capture each of the views, the referenced image capturing device captures each of the four views in the single reflected image 200 decreasing the amount of time that the user is in possession of the key.

As would be appreciated by one having skilled in the relevant art given the description herein, the reflected image 200 and/or any other image of the key may be captured by any type of system that can provide the image of the key with sufficient quality and/or resolution for the conventional key blank generating machine to generate an accurate key blank without changing the applicability of this invention.

In manipulating the end image 240 so that the conventional key blank generating machine software interprets the end image 240 as an image of the corresponding lock, the reflected image 200 is scaled. The reflected image 200 may be depicted to the user via a user interface 280 that enables the user to interact with the reflected image 200. The reflected image 200 includes a distance marker 250 that defines a relative length 260 for the first side image 210. The distance marker 250 includes a first distance mark 265 and a second distance mark 270 so that the distance between each defines the known relative length 260. The known relative length 260 may not be related to the first side image 210 but is rather a known distance on the same plane as the first side image 210.

The user may click on the first distance mark 265 and then the second distance mark 270 via the user interface 280 to determine a quantity of pixels for the first side image 210 that are included between the first distance mark 265 and the second distance mark 270. The quantity of pixels may then be scaled so that a variable is generated that relates the known relative length 260 to a quantity of pixels per the known relative length 260. For example, the relative length 260 is 1 inch. The quantity of pixels included between the first distance mark 265 and the second distance mark 270 is 1000 pixels. As a result, the reflected image 200 is scaled to a variable so that 1000 pixels is substantially equivalent to 1 inch. As would be appreciated by one having skilled in the relevant art given the description herein, the known relative length 260 may be any measurement in the English system, metric system and/or any other measurement system sufficient to scale the pixels included in the reflected image 200 to the known relative length 260 without changing the applicability of this invention.

After scaling the quantity of pixels included in the reflected image 200 to the known relative length 260, any distortion generated in the end image 240 due to the distance of the end of the key to the image capturing device that captured the reflected image 200 may be determined and accounted for. For example, the end of the key depicted by the end image 240 may appear larger when the key captured by the image capturing device is long so that the end of the key is relatively close to the image capturing device. In another example, the end of the key depicted by the end image 240 may appear smaller when the key captured by the image capturing device is short so that the end of the key is relatively far from the image capturing device.

In order to account for any distortion generated in the end image 240, a length 290 of the first side image 210 may be measured and scaled. The user may click via the user interface 280 on a first end 215 of the key depicted by the first side image 210 that is the point on the key that is closest to the image capturing device. The user may also click via the user interface 280 on a second end 205 of the key depicted by the first side image 210 that is farthest from the image capturing device. The length 290 of the first side image 210 may be measured based on the quantity of pixels between the first end 215 and the second end 205 and then scaling the quantity of pixels to the previously determined scale discussed in detail above. As would be appreciated by one having skilled in the relevant art given the description herein, the scaling and/or the accounting for distortion in the reflected image 200 may also be accomplished using the second side image 220 in a similar manner as discussed above regarding the first side image 210 without changing the applicability of this invention.

As mentioned above regarding FIG. 10, the conventional key blank generating machine software assumes the face 175 encompassing the conventional keyhole 150 is a circle with a diameter of 17 mm. A circle with a diameter of 17 mm may be superimposed on the end image 240 so that the conventional key blank generating image interprets the end image 240 as an image of the corresponding keyhole. FIG. 3A shows a scaled end image 300 where a circle 367 with a diameter 363 of 17 mm may be superimposed on the end image 240.

After the end image 240 has been scaled, the circle 367 with the diameter 363 may be generated and superimposed onto the end image 240. The circle 367 may be scaled to the end image 240 so that the quantity of pixels depicted by the end image 240 may be scaled to the diameter 363 of the circle 367. Scaling the circle 367 to the end image 240 minimizes any distortions generated between the diameter 363 of the circle 367 to the pixels depicted by the end image 240. Minimizing the distortions improves the accuracy of the scaled end image 300 so that the conventional key blank generating machine may generate an accurate key blank.

As discussed in detail above, the quantity of pixels that have been scaled to the known relative length 290 has already been determined. As a result, the quantity of pixels relative to the diameter 363 of 17 mm may also be determined to scale the circle 367 to the end image 240 so that the diameter 363 relative to the dimensions of the end image 240 may be accurate. For example, the quantity of pixels scaled to the known relative length 290 is 1000 pixels to 1 inch. 1 inch is equivalent to 25.4 mm so 17 mm is equivalent to 669 pixels. The circle 367 may then be properly scaled to the end image 240 accordingly.

The circle 367 may include a y-axis 385 that extends vertically through a center point 353 of the circle 367 and an x-axis 395 that extends horizontally through the center point 353 of the circle 367. The circle 367 may be superimposed on the end image 240 so that the end image 240 may be substantially centered on the y-axis 385 of the circle 367. The circle 367 may also be superimposed on the end image 240 so that the end image 240 may be positioned so that a bottom edge 355 of the end image 240 is contingent to a circle point 365 located on a circumference 357 of the circle 367 below the x-axis 395 and substantially on the y-axis 385.

As noted above in FIG. 10, the conventional key blank generating machine requires a JPEG image of the conventional keyhole 150. FIG. 3B shows a mirror end image 350 where the mirror end image 350 is a mirror representation of the scaled end image 300. The scaled end image 300 may be modified so that each element included in the mirror end image 350 is a mirror representation of each element included in the scaled end image 300. For example, the end image 240*a* included in the mirror end image 350 may be a mirror representation of the end image 240 included in the scaled end image. The mirror end image 350 may sufficiently represent the keyhole that corresponds to the key that the user requests to replicate so that the conventional key blank generating machine interprets the mirror end image 350 as an image of the corresponding keyhole.

After the mirror end image 350 has been generated, the user may provide the mirror end image 350 to the conventional key blank generating machine. The conventional key blank generating machine software may interpret the mirror end image 350 as the corresponding keyhole. The user may then operate the conventional key blank generating machine software as discussed in detail above to generate the key blank.

In another embodiment, the mirror end image 350 may be further modified for a conventional key blank generating machine that requires an image of a conventional European lock. The conventional European lock receives the conventional key blank 100 as shown in FIG. 1A so that the key stop 120 is located on the bottom side 105 of the conventional key blank 100 rather than the top side 107 of the conventional key blank 100. As a result, the mirror end image 350 may be further modified so that the mirror end image 350 is rotated 180 degrees so that the bottom edge 355a of the end image 240a is actually at the top of the end image 240a rather than at the bottom. As a result, the conventional key blank generating machine that requires an image of a conventional European lock may interpret the modified mirror end image 350 as an image of the corresponding lock.

As would be appreciated by one having skilled in the relevant art given the description herein, the mirror end image 350 provided to the conventional key blank generating machine may be a JPEG image file, JFIF image file, JPEG 2000 image file, Exif image file, TIFF image file, RAW image file, GIF image file, BMP image file, PNG image file, PPM image file, PGM image file, PBM image file, PNM image file, PFM image file, PAM image file, WEBP image file, RGBE image file, and/or any other image file that may be received by a conventional key blank generating machine without changing the applicability of this invention. As would be appreciated by one having skilled in the relevant art given the description herein, the circle 367 may be superimposed onto the end image 240 with any length of diameter as required by any conventional key blank generating machine without changing the applicability of this invention.

Referring to FIG. 2A which is a scaled view of first side image 210 depicted in FIG. 2, as noted above, the conventional key machine requires that the user provide the bitting number of the key that the user requests to replicate. The bitting number of the key corresponds to a maximum depth of each cut included in the key. Each cut in the key may be identified as having a first edge and a second edge that are coupled together at a maximum depth point that is at a substantially maximum depth for the cut. For example, a first cut 225 as depicted by the first side image 210 includes a first edge 235 and a second edge 245 that are coupled together at a maximum depth point 257 that is at a substantially maximum depth for the first cut 225.

The key manufacturer of the key typically associates an integer value to the maximum depth for each cut so that each key includes a bitting number with a series of integers where each integer corresponds to the maximum depth for each cut for the key manufacturer. For example, the key manufacturer defines a maximum depth of 0.307 inches with a "1", a maximum depth of 0.291 inches with a "2", and a maximum depth of 0.276 inches with a "3". The conventional key machine then cuts key blank with a first cut at 0.307 inches, a second cut at 0.291 inches, and a third cut at 0.276 inches when a bitting number of "123" for the key manufacturer is entered into the conventional key machine. The key manufacturer may also associate other values such as letters and/or a combination of letters and integers to the maximum depth for each cut as bitting numbers for the key.

However, the user may not have access to the key that the user requests to replicate for a sufficient amount of time to determine the bitting number from the actual key. Rather, the user may have to determine the bitting number from the first side image 210 included in the reflected image 200. In an embodiment of the present disclosure, the maximum depths of each cut depicted in the first side image 210 may be measured. A bitting number database (not shown) may then be queried for bitting numbers of several key manufacturers that are associated with maximum depths that are within a threshold of each of the measured maximum depths measured from the first side image 210. The determined bitting numbers and the key manufacturer information provided by the bitting number database may then be provided to the conventional key machine to replicate the key.

Accurate measurements of each maximum depth obtained from each cut as depicted in the first side image 210 may be required to obtain accurate bitting numbers from the bitting number database. As a result, the first side image 210 may be of high quality and high resolution so that accurate measurements may be made for each maximum depth. A lower quality image with lower resolution may hinder the accuracy of the measurements obtained for each maximum depth and thus result in inaccurate bitting numbers that are retrieved from the bitting number database. As noted above, an example of an image capturing system (not shown) that may capture an image, such as the reflected image 200, of sufficient quality and resolution to obtain accurate measurements of each maximum depth to retrieve accurate bitting numbers from the bitting number database is provided in U.S. patent application Ser. No. 13/833,313, the disclosure of which is incorporated by reference herein.

As would be appreciated by one having skilled in the relevant art given the description herein, the reflected image 200 and/or any other image of the key may be captured by any type of system that can provide the image of the key with sufficient quality and/or resolution for accurate measurements of each maximum depth to be obtained without changing the applicability of this invention.

As noted above, the reflected image 200 may be depicted to the user via the user interface 280 that enables the user to interact with the reflected image 200. The first side image 210 may depict the first cut 225, a second cut 255, and a third cut 268. In measuring the maximum depth of each of the first cut 225, the second cut 255, and the third cut 268, the reflected image 200 is first scaled. As discussed in detail above, the reflected image 200 may be scaled so that the quantity of pixels included between the first distance mark 265 and the second distance mark 270 may be scaled to the known relative length 260 so that the quantity of pixels per the known relative length 260 is determined.

A reference point with an (x, y) coordinate may be determined so that any measurement is based from the reference point. The user may click on the key stop 275 via the user interface 280 as the reference point on the x-axis 285 so that any measurement obtained along the x-axis 285 may be relative to the key stop 275. For example, a measurement of the first end 215 along the x-axis 285 is the distance from the key stop 275 to the first end 215. In an embodiment, the user may click on the first end 215 via the user interface as the reference point on the x-axis 285 when first side key image 210 does not depict the key stop 275, such as an image of an automobile key.

The user may click on a bottom edge 203 via the user interface 280 as the reference point on the y-axis 295 so that any measurement obtained along the y-axis 295 may be relative to the bottom edge 203. For example, a measurement obtained from the maximum depth point 257 along the y-axis 295 is the distance from the bottom edge 203 to the maximum depth point 257. The bottom edge 203 may be on the opposite edge of the first side key image 210 from the first cut 225, the second cut 255, and the third cut 268.

After scaling the reflected image 200 and defining the reference point on the first side image 210, a depth and a spacing may be measured for a maximum depth point for each of the first cut 225, the second cut 255, and the third cut 268. The user via the user interface 280 may click on the maximum depth point 257 for the first cut 225, a maximum depth point 267 for the second cut 255, and a maximum depth point 277 for the third cut 268. The maximum depth points 257, 267, and 277 may be substantially centered in each of their respective cuts 225, 255, and 265 while at the maximum depth for each of the respective cuts 225, 255, and 265.

Clicking on each of the maximum depth points 257, 267, and 277 via the user interface 280 may measure the depth for each of the maximum depth points 257, 267, and 277. The depth may be the vertical distance of the maximum depth points 257, 267, and 265 for each of the cuts 225, 255, and 265 to the bottom edge 203. For example, the measured depth for the first maximum depth point 257 is depth 287, the measured depth for the second maximum depth point 267 is depth 297, and the measured depth for the third maximum depth point 277 is depth 207.

Clicking on each of the maximum depth points 257, 267, and 277 via the user interface 280 may also measure the spacing for each of the maximum depth points 257, 267, and 277. The spacing may be the horizontal distance between the maximum depth points 257, 267, and 277. For example, the measured first spacing 213 is the horizontal distance between first maximum depth point 257 and the key stop 275. The measured second spacing 223 is the horizontal distance between the first maximum depth point 257 and the second maximum depth point 267. The measured third spacing 233 is the horizontal distance between the second maximum depth point 267 and the third maximum depth point 273.

An experienced user may visually recognize that two or more of the depths 287, 297, and 207 for each of the cuts 225, 255, and 265 and/or the spacings 213, 223, and 233 are substantially similar. Although the depths and/or spacings are substantially similar, there may be a difference between the actual measurements of each substantially similar depth and/or spacing based on a difference in where the user clicked on each of the cuts 225, 255, and 265 via the user interface 280 when clicking on each respective maximum depth points 257, 267, and 277. The user interface 280 may provide the user the option to average the actual measurements of each of the substantially similar depths and/or spacings to minimize any error generated by the user not quite clicking on the center of each of the cuts 225, 255, and 265.

For example, the user visually identifies that the maximum depths for the second cut 255 and the third cut 268 are substantially similar. However, the measured depths 297 and 207 differ from each other because the user did not click on the center of the second cut 255 and/or the third cut 268 when selecting the second maximum depth point 255 and the third maximum depth point 277. The user identifies that the measured depths 297 and 207 should be substantially similar but differ because of the user's error, the user selects via the user interface 280 to average measured depths 297 and 207 together to minimize the error providing more accurate depth measurements.

After each of the depths 287, 297, and 207 have been measured, the bitting number database may be queried for bitting numbers that are within a threshold of the measured depths 287, 297, and 207. The user via the user interface 280 may designate the threshold and/or adjust the threshold accordingly to increase and/or decrease the threshold. As noted above, the measured depths 287, 297, and 207 may correspond to the bitting numbers for each of the cuts 225, 255, and 265 as defined by the key manufacturer of the key. However, the key manufacturer of the key may not be known. Also, the bitting numbers implemented by each key manufacturer may differ. For example, a first key manufacturer defines the maximum depth for a cut as 0.307 inches with a "1" while a second key manufacturer defines the same depth of 0.307 inches with a "2". Thus, simply searching the bitting number database for bitting numbers that correspond to each measured depth 287, 297, and 207 may result in several different bitting numbers from several different key manufacturers which may be too vast to easily narrow down to the correct bitting number for the correct key manufacturer of the key.

As a result, the bitting number database may group the bitting numbers with corresponding depths and the spacings with corresponding cuts together for each key manufactured by a each key manufacturer. For example, FIG. 4 is an example entry 400 included in the bitting number database. The example entry 400 includes the spacing, depth, cut, and bitting number information for a specific key manufactured by a specific key manufacturer. "Spacing 1" corresponds to the spacing between the key stop and the first cut of the key. "Spacing 2" corresponds to the spacing between the first cut and the second cut. "Spacing 3" corresponds to the spacing between the second cut and the third cut. "Depth 1" identifies a bitting number of "1" that is associated with a depth of 0.324 inches. "Depth 2" identifies a bitting number of "2" that is associated with a depth of 0.310 inches. "Depth 3" identifies a bitting number of "3" that is associated with a depth of 0.296 inches.

Rather than broadly querying the bitting number database for bitting numbers that are within a threshold of the depths 287, 297, and 207, the query may be narrowed to also include the spacings 213, 223, and 233. As a result, only the bitting numbers for the depths 287, 297, and 207 that are also associated with the spacings 213, 223, and 233 are provided to the user. Such results may be much more manageable for the user to analyze to determine the appropriate bitting number for the key that the user request to replicate.

For example, the first depth 287 is measured at 0.295 inches, the second depth 297 is measured at 0.330 inches, and the third depth 207 is measured at 0.290 inches. The first spacing 213 is measured at 0.165 inches, the second spacing 223 is measured at 0.335 inches, and the third spacing 233 is measured at 0.480 inches. The user via the user interface 280 selects a threshold of 0.01 inches so that each of the results returned by the bitting number database is within the threshold of 0.01 inches.

Each measurement is compared to the bitting number database entry displayed in FIG. 4. The first spacing 213 of 0.165 inches is compared to "Spacing 1: 0.169 inches" in FIG. 4. The difference between each is 0.004 inches and is within the threshold of 0.01 inches. The second spacing 223 of 0.335 inches is compared to "Spacing 2: 0.327 inches." The difference between each is 0.008 inches and is within the threshold of 0.01 inches. The third spacing 233 of 0.480 inches is compared to "Spacing 3: 0.484 inches." The difference between each is 0.004 inches and is within the threshold of 0.01 inches. As a result, the key depicted in FIG. 4 may be a sufficient match to the key depicted by the first side image 210.

Each depth 287, 297, and 207 is then compared to the depth information 400 in FIG. 4 to determine if the depths are within the 0.01 inch threshold and if so, the bitting number associated with each depth. The first depth 287 of 0.295 inches is compared to each of the depths displayed in FIG. 4. "Depth 2: 0.310 inches" is within the 0.01 inch threshold. As a result, the bitting number "2" is associated with the first cut 225. The second depth 297 of 0.330 inches is compared to each of the depths displayed in FIG. 4. "Depth 1: 0.324 inches" is within the 0.01 inch threshold. As a result, the bitting number "1" is associated with the second cut 255. The third depth of 0.290 inches is compared to each of the depths displayed in FIG. 4. "Depth 3: 0.296 inches" is within the 0.01 inch threshold. As a result, the bitting number "3" is associated with the third cut 268. The manufacturer name and the bitting number "213" is then displayed to the user via the user interface 280. The user may then provide the manufacturer name and the bitting number "213" to the conventional key machine to replicate the key that is depicted by the first side image 210.

The user may adjust the threshold accordingly to expand and/or narrow the results provided to the user until the user is comfortable that the correct manufacturer name and the bitting number have been obtained. The user may also narrow the results by identifying via the user interface whether the first key image 210 depicts a single sided key or a double sided key. A single sided key has cuts on a single side of the key while a double sided key has cuts on both sides of the key.

As would be appreciated by one having skill in the relevant art given the description herein, the first side image 210 may depict a key with any size dimensions and/or any number of cuts without changing the applicability of this invention. As would be appreciated by one having skill in the relevant art given the description herein, the bitting number database may include data for any type of key manufactured by any type of key manufacturer without changing the applicability of this invention. As would be appreciated by one having skill in the relevant art the measurements obtained from the first side image 210 may also be obtained from the second side image 220 without changing the applicability of this invention.

In an embodiment of the present disclosure, the cuts 225, 255, and 265 may be rotational cuts (not shown) where there is a rotation within each of the respective cuts 225, 255, and 265. The first side image 210 may display the angle (not shown) of the rotation for each of the respective cuts 225, 255, and 265. The user via the user interface 280 may outline the angle of each of the rotations to measure each of the angles. The bitting number database may then be queried for keys that have similar angles in the rotational cuts. The user may also determine the actual angle cutter used to cut each of the rotational cuts and then determine the key and the manufacturer of the key from the angle cutter data.

In an embodiment of the present disclosure, the side 243 as depicted by the first side image 210 may include side cuts (not shown). The user via the user interface 280 may measure the side cuts. The bitting number database may then be queried for keys that have similar side cuts.

In an embodiment of the present disclosure, the side 243 as depicted by the first side image 210 may include dimples (not shown) that are milled into the side 243. The user via the user interface 280 may click on points along the circumference of each dimple to measure the diameter of each dimple. The diameter of the dimple may correspond to the depth of the dimple. The bitting number database may then be queried for keys that have dimples with similar diameters and provide the corresponding depths.

FIG. 5 is an example database system architecture 500 in which embodiments of the present invention, or portions thereof, may be implemented. System architecture includes key blank image generating computing device 505 coupled to key image database 510. Key blank image generating computing device 505 may also be coupled to superimposed circle database 540 and key blank image database 575. While the embodiments depicted in FIG. 5 shows key blank image generating computing device 505 connected to key image database 510, superimposed circle database 540, and key blank image database 575, it is important to note that embodiments can be used to exchange data between a variety of different types of computer-implemented data sources, systems and architectures. For example, architecture 500 may be distributed over a network cloud.

In general, key blank image generating computing device 505 operates as follows. Key image database 510 supplies an end image 515 of an end of a key that the user requests to replicate but no longer has possession. The end image 515 of the key may have been captured by an image capturing device and stored in the key image database 510. The image rotating module 520 receives the end image 515 and rotates the end image 515 to generate the rotated end image 525. The rotated end image 525 is a mirror image of the end image 515 so that the rotated end image 525 resembles a corresponding keyhole of the key that the user is requesting to replicate.

The image generation module 530 receives the rotated end image 525 from image rotating module 520. The image generation module 530 receives a superimposed circle 535 from the superimposed circle database 540. The superimposed circle 535 represents a face of a keyhole that a conventional key blank generating machine requires for scale when generating a key blank based on an image of a keyhole. The image generation module 530 superimposes the superimposed circle 535 on the rotated end image 525 to generate the key blank image 550. The key blank image 550 is a modified image of the end image 515 of the key to replicate an image of the corresponding keyhole of the key.

The image providing module 560 provides the key blank image 550 to the key blank image database 575 for the conventional key blank generating machine to access. The conventional key blank generating machine may interpret the key blank image 550 as an image of the corresponding keyhole for the key the user requests to replicate and may generate a key blank for the user based on the key blank image 550.

FIG. 6 is an example database system architecture 600 in which embodiments of the present invention, or portions thereof, may be implemented. System architecture includes key replication computing device 605 coupled to key image database 610. Key replication computing device 605 may also be coupled to bitting number database 640 and key bitting number database 665. While the embodiments depicted in FIG. 6 shows key blank replication computing device 605 connected to key image database 610, bitting number database 640, and key bitting number database 665, it is important to note that embodiments can be used to exchange data between a variety of different types of computer-implemented data sources, systems and architectures. For example, architecture 600 may be distributed over a network cloud.

In general, key replication computing device 605 operates as follows. Key image database 610 supplies a side image 615 of a side of a key that the user requests to replicate but no longer has possession. The side image 615 of the key may have been captured by an image capturing device and stored in the key image database 610. The cut identification module 620 receives the side image 615 and identifies the cuts 625 included in the key as depicted by the side image 615.

The cut measurement module 630 receives the cuts 625 from the cut identification module 620 and measures each maximum depth of the cuts 625 to generate the cut measurements 635. The querying module 650 receives the cut measurements 635 from the cut measurement module 630 and queries the bitting number database 640 for bitting numbers 645. The bitting numbers 645 stored in the bitting number database 640 correspond to depths as designated by the key manufacturers for different keys. The querying module 650 queries the bitting numbers 645 for bitting numbers with corresponding depths that are within a threshold of the cut measurements 635. The querying module 650 determines the key bitting numbers 655 from the bitting numbers 645 that are within the threshold of the cut measurements 635.

The providing module 660 receives the key bitting numbers 655 from the querying module 650 and provides the key bitting numbers 660 to the key bitting number database 665. The key bitting numbers 660 may be retrieved from the key bitting number database 665 by a conventional key machine to generate a replica of the key from a key blank that the user requests to replicate based on the key bitting numbers 660.

Modules as described above may be used by key blank image generating computing device 505 and key replication computing device 605. As referred to herein, a module may be any type of processing (or computing) device having one or more processors. For example, a module can be an individual processor, workstation, mobile device, computer, cluster of computers, set-top box, game console or other device having at least one processor. In an embodiment, multiple modules may be implemented on the same processing device. Such a processing device may include software, firmware, hardware, or a combination thereof. Software may include one or more applications and an operating system. Hardware can include, but may not be limited to, a processor, memory, and/or graphical user display.

In an embodiment of the present disclosure, the reflected image 200 may have a slight pincushioning distortion when a communications device is used to capture the reflected image 200. The slight pincushioning distortion is where the image magnification of the key in the reflected image 200 increases with the distance from the optical axis. The effect on the reflected image 200 from the slight pincushioning may be that the reflected image 200 may bow inwards like a pincushion. The pincushioning distortion of the reflected image 200 although slight, may have altered the measurements of the first side image 210 of the key a couple thousandths of an inch and may have an effect in adequately replicating the key.

In order to account for the pincushioning distortion of the reflected image 200, the user may first capture a reflected image of a calibration key of a known size and of known depths for each cut in the calibration key with the image capturing device that the user has available. Cut measurement module 630 may capture measurements of the cuts of the calibration key as discussed in detail above. A difference in the measurements captured my cut measurement module 630 of the calibration key from the known measurements may be a result of the pincushioning distortion caused by the image capturing device implemented by the user. The user may then capture the reflected image 200 of the key that the user requests to replicate. The measurements of the cuts in the key depicted by the reflected image 200 may be captured by cut measurement module 630 as discussed in detail above. However, the measurements of the cuts in the key may be adjusted by cut measurement module 630 by the difference caused by the pincushioning distortion determined from the calibration key. As a result, the pincushioning distortion caused by the image capturing device may be accounted for further improving the accuracy of the measurements.

In another embodiment, the reflected image 200 may be slightly warped by key replication computing device 605 to account for the pincushioning distortion. In such an embodiment, measurements captured from the warped image of the reflected image 200 by cut measurement module 630 may have already accounted for the pincushioning distortion so the measurements may not require further adjusting by cut measurement module 630.

In an embodiment of the present disclosure, the measurements captured from the reflected image 200 by cut measurement module 630 discussed in detail above may be automated without any user input so that the user is not required to click on the reflected image 200 via user interface 280. Rather, the measurements may be automatically captured by cut measurement module 630 after the reflected image 200 has been captured by the user and submitted for measurements. Before capturing the reflected image 200 of the key, an image of the backdrop in which the key is to be placed when capturing the reflected image 200 of the key is captured. Key replication computing device 605 may analyze the image of the backdrop without the key. The reflected image 200 of the key is then captured. Based on the analysis of the image of the backdrop without the key, key replication computing device 605 may remove the data of the backdrop from the reflected image 200. Key replication computing device 605 may then detect the edge of the key depicted in the reflected image 200 along the contour of the key. Key replication computing device 605 may detect where each cut is in the key and cut measurement module 630 may measure the depth of each cut in the key without any inputs from the user.

In another embodiment, the user may trace the contour of the key depicted by the reflected image 200 via user interface 280. Key replication computing device 605 may then detect the edge of the key depicted in the reflected image 200 based on the trace of the contour of the key inputted by the user via user interface 280. Key replication computing device 605 may then detect where each cut is in the key and cut measurement module 630 may measure the depth of each cut in the key without the user selecting the maximum depth for each cut in the key. The automated measurement of the depths of each cut in the key by cut measurement module 630 may minimize the user error generated by the user not quite clicking on the maximum depth of each cut in the key via user interface 280.

FIG. 7 illustrates an exemplary method 700 for generating a key blank image from a key that is capable of being processed by a key blank generating machine to generate a key blank of the key. As shown in FIG. 7, method 700 begins at step 710, where an end image of an end of the key is captured. The end of the key is a portion of the key that is aligned with a corresponding lock to insert the key into the corresponding lock. For example, as shown in FIG. 2, an end image 240 of an end of the key is captured. Once step 710 is complete, method 700 proceeds to step 720.

At step 720, the end image is rotated so that the rotated end image is a mirror image of the end of the key so that an outline of the mirror image of the end of the key is substantially similar to an outline of the corresponding keyhole that the key is inserted. For example, as shown in FIG. 3B, the end image 240 is rotated so that the rotated end image is a mirror image 240a of the end of the key so that an outline of the mirror image 240a of the end of the key is substantially similar to an outline of the corresponding keyhole that the key is inserted. Once step 720 is complete, method 700 proceeds to step 730.

At step 730, the key blank image is generated from the mirror image of the end of the key to approximate a keyhole image of the keyhole that corresponds to the key. For example, as shown in FIG. 3B, the key blank image 350 is generated from the mirror image 240a of the end of the key to approximate a keyhole image of the keyhole that corresponds to the key. Once step 730 is complete, method 700 proceeds to step 740.

At step 740, the key blank image is provided to the key blank generating machine to generate the key blank of the key. For example, as shown in FIG. 3B, the key blank image 350 is provided to the key blank generating machine to generate the key blank of the key. When step 740 is completed, method 700 ends.

FIG. 8 illustrates an exemplary method 800 for replicating a key from a key blank of the key based on data obtained from a key image of the key. As shown in FIG. 8, method 800 begins at step 810, where the key image of the key is captured. The key image depicts a length of the key. For example, as shown in FIG. 2, the key image 210 of the key is captured. The key image 210 depicts a length 240 of the key. Once step 810 is complete, method 800 proceeds to step 820.

At step 820, each cut located in the key as depicted by the key image is identified. Each cut is identified as having a first edge and a second edge that are coupled together at a maximum depth point that is at a substantially maximum depth for the cut. For example, as shown in FIG. 2, each cut 225, 255, and 265 located in the key as depicted by the key image 210 is identified. Each cut is identified as having a first edge 245 and a second edge 235 that are coupled together at a maximum depth point 257 that is at a substantially maximum depth 287 for the cut 225. Once step 820 is complete, method 800 proceeds to step 830.

At step 830, each maximum depth of each cut for the key is measured as depicted by the key image. For example, as shown in FIG. 2, each maximum depth 287, 297, and 207 of each cut 225, 255, and 265 for the key are measured as depicted by the key image 210. Once step 830 is complete, method 800 proceeds to step 840.

At step 840, a bitting number database is queried for each bitting number that corresponds to each measured maximum depth for each cut. For example, as shown in FIG. 6, a bitting number database 640 is queried for each bitting number 645 that corresponds to each measured maximum depth 635 for each cut. Once step 840 is complete, method 800 proceeds to step 850.

At step 850, each bitting number that corresponds to each cut queried from the bitting number database is provided to a key generating machine to cut the key blank based on each bitting number for each corresponding cut. For example, as shown in FIG. 6, each bitting number 655 that corresponds to each cut 635 queried from the bitting number database 640 is provided to a key generating machine to cut the key blank based on each bitting number 655 for each corresponding cut 635. When step 850 is completed, method 800 ends.

FIG. 9 illustrates an example computer system 900 in which embodiments of the present invention, or portions thereof, may be implemented as computer-readable code. For example, the key blank image generating computing device 505 and the key replication computing device 605 may be implemented on computer system 900 using hardware, software, firmware, tangible computer readable media having instructions stored thereon, or a combination thereof and may be implemented in one or more computer systems or other processing system.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, a computing device having at least one processor device, such as processor device 404, where the processor device may be a single processor, a plurality of processors, a processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, removable storage drive 914. Removable storage drive 914 may include a floppy disk drive, a magnetic tape drive, an optical disk drive, a flash memory, or the like. The removable storage drive 914 reads and/or writes to a removable storage unit 918 in a well-known manner. Removable storage unit 918 may include a floppy disk, magnetic tape, optical disk, etc. which is read by and written to by removable storage drive 914. As will be appreciated by persons skilled in the relevant art, removable storage unit 918 includes a computer readable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interfaces 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926.

In this document, the terms "computer program storage medium" and "computer usable storage medium" are used to generally refer to storage media such as removable storage unit 918, removable storage unit 922, and a hard disk installed in hard disk drive 912. Computer program storage medium and computer usable storage medium may also refer to memories, such as main memory 908 and secondary memory 910, which may be memory semiconductors (e.g. DRAMS, etc.).

Computer programs (also called computer control logic) are stored in main memory 908 and/or secondary memory 910. Computer programs may also be received via communications interface 924. Such computer programs, when executed, enable computer system 900 to implement embodiments as discussed herein. In particular, the computer programs, when executed, enable processor device 904 to implement the processes of the disclosure, such as the stages in the method illustrated by flowchart 700 of FIG. 7 and flowchart 800 of FIG. 8 discussed above. Accordingly, such computer programs represent controllers of the computer system 900. When an embodiment is implemented using software, the software may be stored in a computer program product and loaded into computer system 900 using removable storage drive 914, interface 920, and hard disk drive 912, or communications interface 924.

Embodiments can work with software, hardware, and/or operating system implementations other than those described herein. Any software, hardware, and operating system implementation suitable for performing the functions described herein can be used. Embodiments are applicable to both a client and to a server or a combination of both.

The Brief Summary and Abstract sections may set forth one or more but not all exemplary embodiments as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims. What is claimed is:

The invention claimed is:

1. A computer implemented method for generating a key blank image from a key that is capable of being processed by a key blank generating machine to generate a key blank of the key, comprising:
  capturing an end image of an end of the key, wherein the end of the key is a portion of the key that is aligned with a corresponding keyhole to insert the key into the corresponding keyhole;
  rotating the end image so that the rotated end image is a mirror image of the end of the key so that an outline of the mirror image of the end of the key is substantially similar to an outline of the corresponding keyhole that the key is inserted;
  generating the key blank image from the mirror image of the end of the key to approximate a keyhole image of the keyhole that corresponds to the key; and
  providing the key blank image to the key blank generating machine to generate the key blank of the key.

2. The method of claim 1, wherein the generating of the key blank image comprises:
  generating a reference circle with a plurality of dimensions substantially similar to a plurality of dimensions associated with a scalable circle used by the key blank generating machine to scale each image provided to the key blank generating machine; and
  superimposing the reference circle around the key blank image to scale the key blank image to the reference circle so that the key blank generating machine processes the key blank image to generate the key blank of the key.

3. The method of claim 2, wherein the generating of the key blank image further comprises:
  capturing a side image of the side of the key, wherein the side image of the key depicts a length of the key;
  measuring the length of the key from the side image; and
  generating the reference circle relative to the length of the key with the plurality of dimensions substantially similar to the plurality of dimensions associated with the scalable circle used by the key blank generating machine.

4. The method of claim 3, wherein the generating of the reference circle relative to the length of the key accounts for a distortion in the end image of the key caused by a distance the end of the key is located from an image capturing source that captured the end image.

5. The method of claim 1, wherein the rotating of the end image comprises:
  rotating the mirror image of the end of the key 180 degrees in generating the key blank image when the key blank generating machine is configured to process keyhole images of keyholes rotated 180 degrees.

6. A system for generating a key blank image from a key that is capable of being processed by a key blank generating machine to generate a key blank of the key, comprising:
  at least one processor; and
  a memory coupled with the processor, the memory including instructions that, when executed by the processor cause the processor to:
    capture an end image of an end of the key, wherein the end of the key is a portion of the key that is aligned with a corresponding keyhole to insert the key into the corresponding keyhole;
    rotate the end image so that the rotated end image is a mirror image of the end of the key so that an outline of the mirror image of the end of the key is substantially similar to an outline of the corresponding keyhole that the key is inserted;
    generate the key blank image from the mirror image of the end of the key to approximate a keyhole image of the keyhole that corresponds to the key; and
    provide the key blank image to the key blank generating machine to generate the key blank of the key.

7. The system of claim 6, wherein the generating of the key blank image further comprises:
  generating a reference circle with a plurality of dimensions substantially similar to a plurality of dimensions associated with a scalable circle used by the key blank generating machine to scale each image provided to the key blank generating machine, and
  superimposing the reference circle around the key blank image to scale the key blank image to the reference circle so that the key blank generating machine processes the key blank image to generate the key blank of the key.

8. The system of claim 7, wherein the capturing of the end image further comprises capturing a side image of the side of the key, wherein the side image of the key depicts a length of the key.

9. The system of claim 8, wherein the generating of the key blank image further comprises:
  measuring the length of the key from the side image, and
  generating the reference circle relative to the length of the key with the plurality of dimensions substantially similar to the plurality of dimensions associated with the scalable circle used by the key blank generating machine.

10. The system of claim 9, wherein the generating of the reference circle relative to the length of the key accounts for a distortion in the end image of the key caused by a distance the end of the key is located from an image capturing source that captured the end image.

11. The system of claim 6, wherein the rotating of the end image further comprises rotating the mirror image of the end of the key 180 degrees in generating the key blank image when the key blank generating machine is configured to process lock images of locks having keyholes rotated 180 degrees.

\* \* \* \* \*